June 9, 1942. R. S. BOHANNAN 2,285,892
HYDRAULIC WEIGHING SCALE
Filed Oct. 17, 1939 4 Sheets-Sheet 1
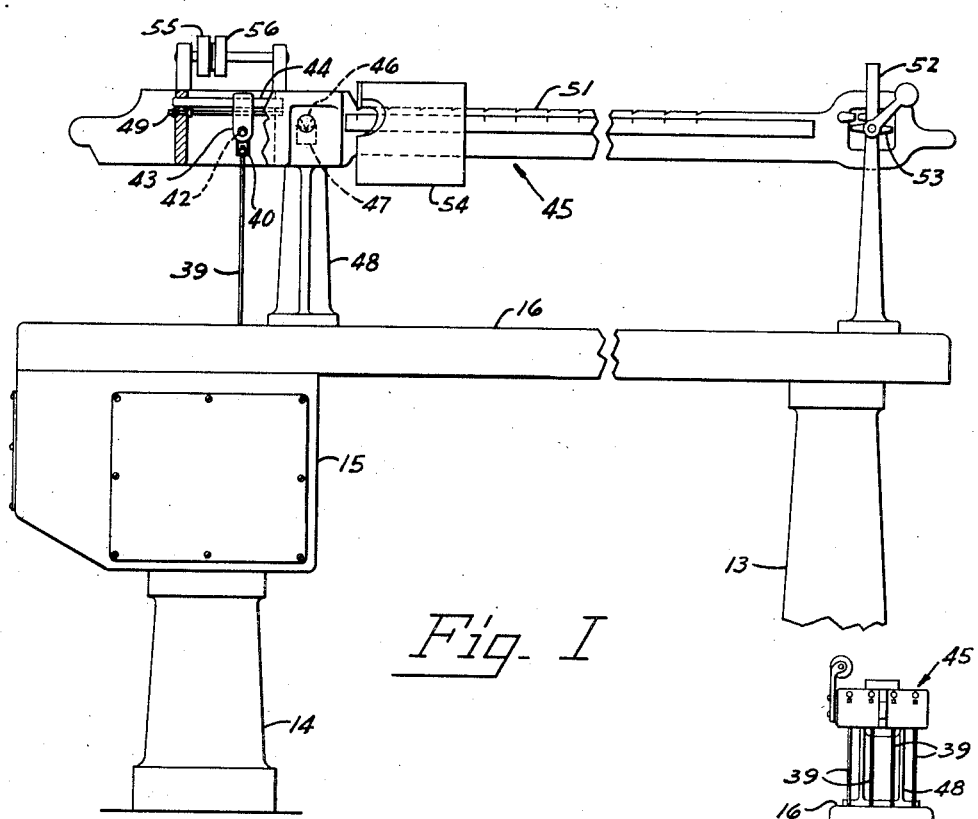
Fig. I
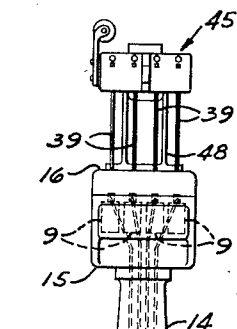
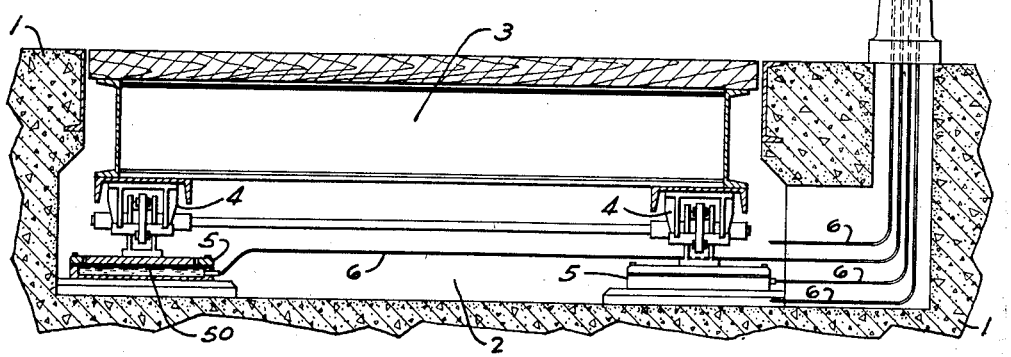
Fig. II
Robert S. Bohannan
INVENTOR
BY Marshall & Marshall
ATTORNEYS

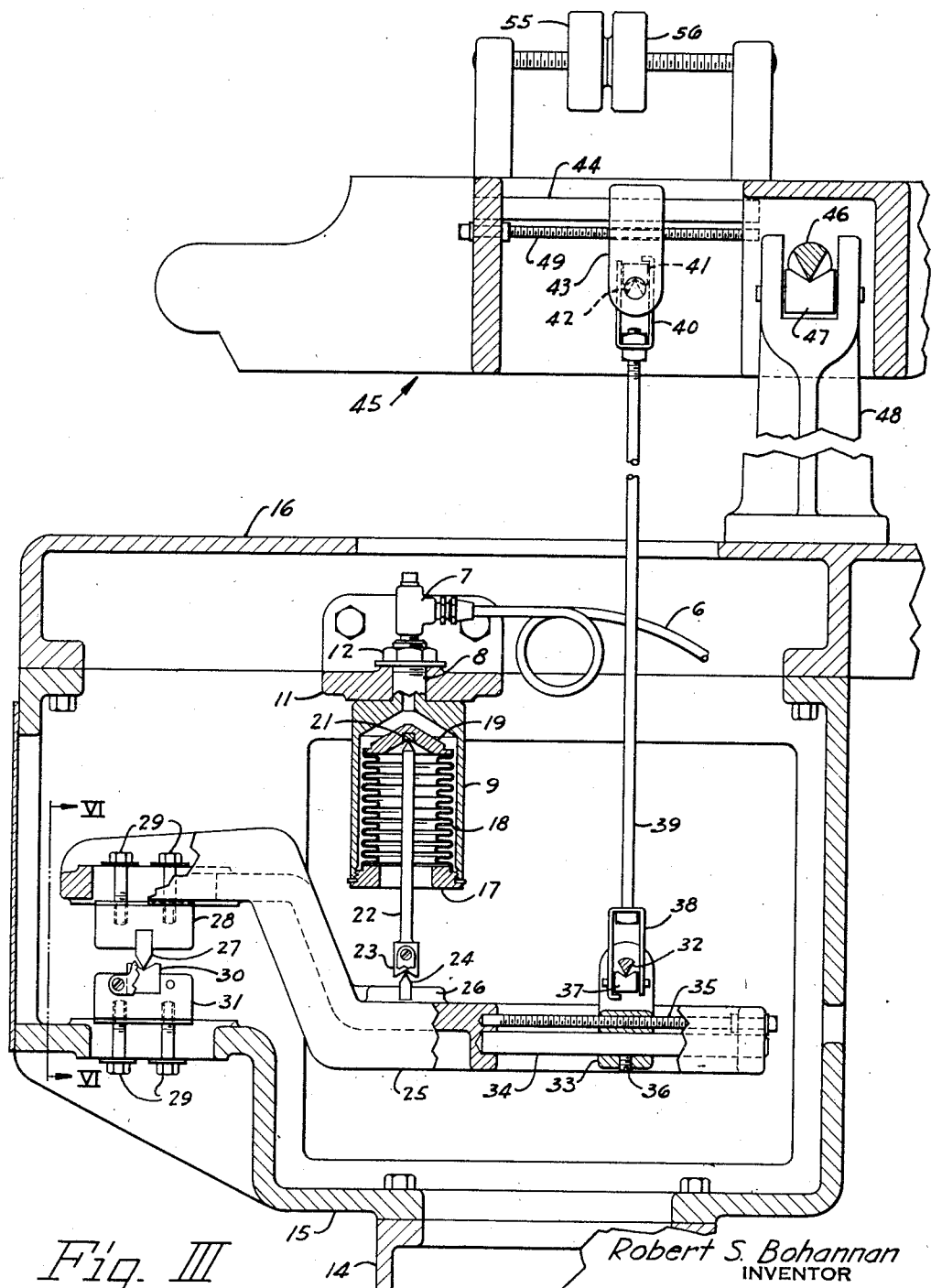

June 9, 1942.  R. S. BOHANNAN  2,285,892
HYDRAULIC WEIGHING SCALE
Filed Oct. 17, 1939  4 Sheets-Sheet 3
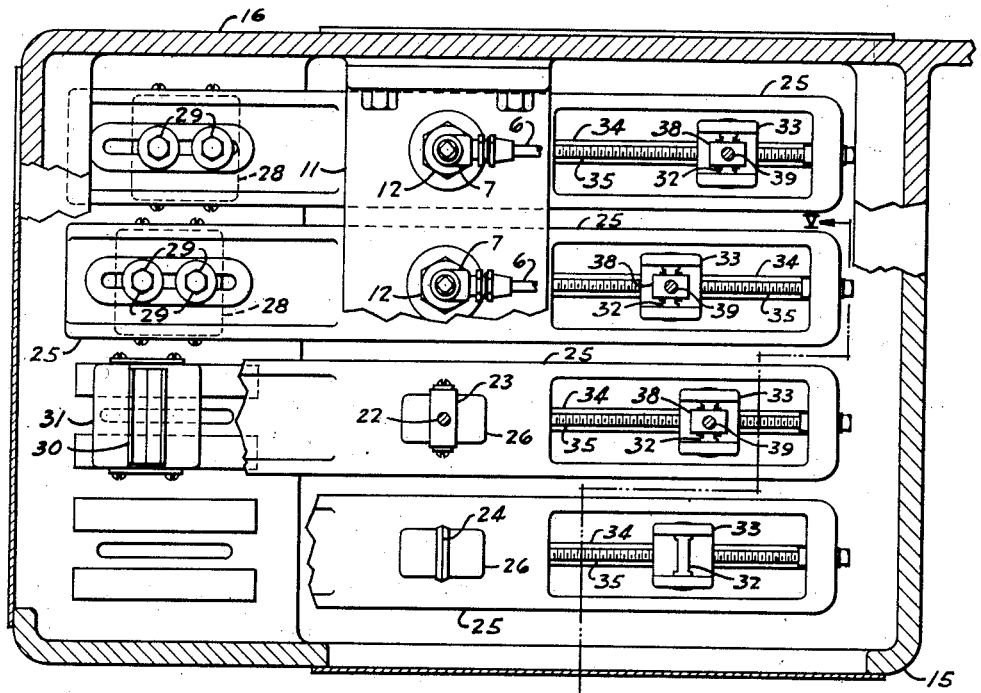
Fig. IV
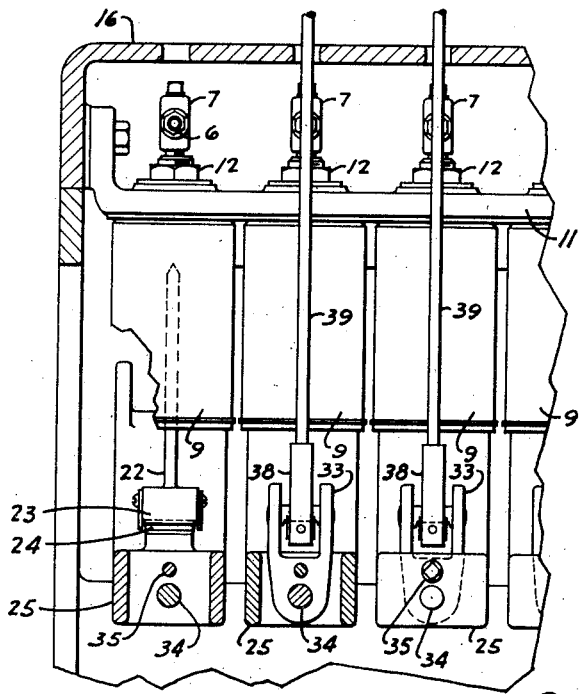
Fig. V
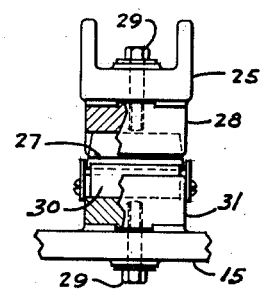
Fig. VI
Robert S. Bohannan
INVENTOR
BY Marshall & Marshall
ATTORNEYS

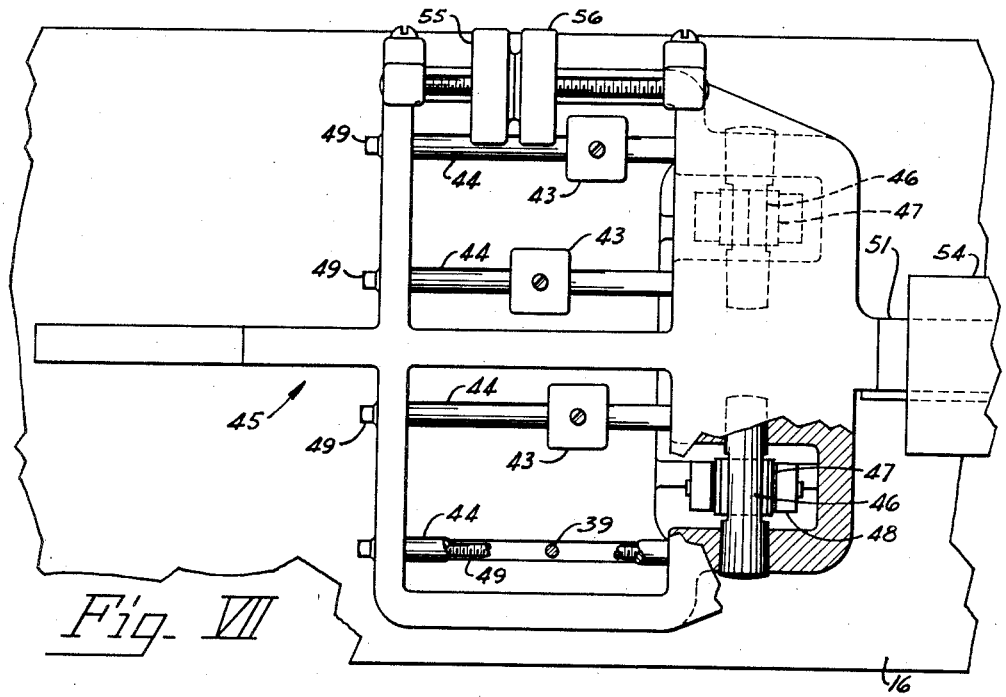
Fig. VII
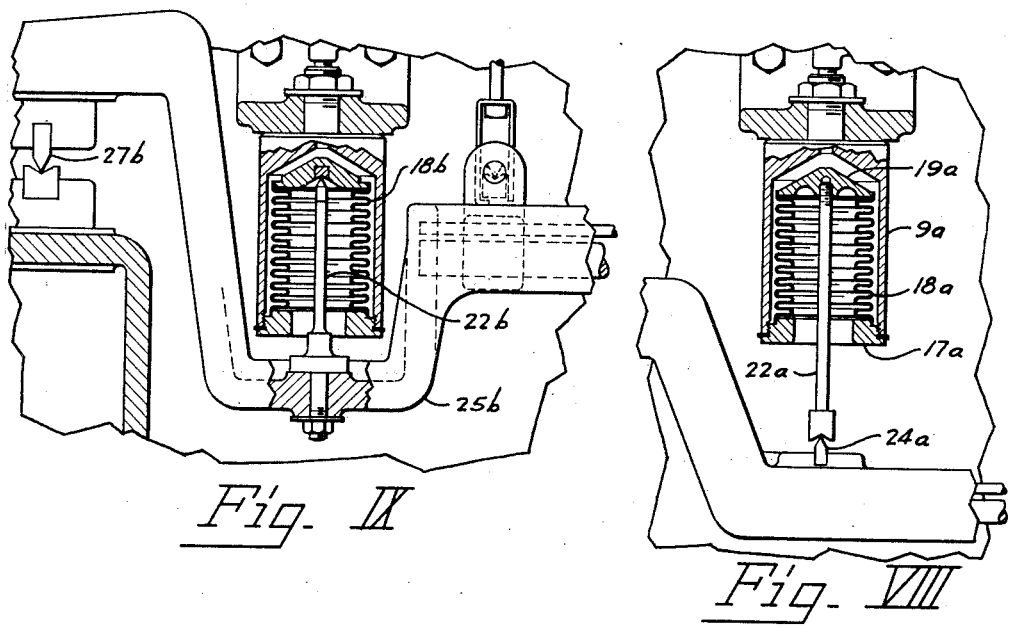
Fig. IX
Fig. VIII
Robert S Bohannan
INVENTOR
BY Marshall & Marshall
ATTORNEYS Patented June 9, 1942

2,285,892

UNITED STATES PATENT OFFICE 2,285,892

HYDRAULIC WEIGHING SCALE

Robert S. Bohannan, Toledo, Ohio, assignor to Toledo Scale Company, Toledo, Ohio, a corporation of New Jersey Application October 17, 1939, Serial No. 299,833

8 Claims. (Cl. 265—47)

This invention relates to hydraulic weighing scales of the general type illustrated and described in my copending application for United States Letters Patent, Ser. No. 222,831, filed August 3, 1938. In this type of hydraulic weighing scales, forces exerted by loads on load receivers are transmitted hydraulically to metallic bellows, and thence through linkage and leverage to load counterbalancing mechanism.

It is an object of this invention to improve the manner of application of hydraulic forces to such metallic bellows.

Another object of the invention is to improve the means whereby the hydraulic forces applied to the metallic bellows are transmitted to leverage connected to load counterbalancing mechanism.

Another object is to provide an improved means of adjustment to compensate for differences in area of surfaces to which hydraulic pressures are applied.

Another object is to provide an improved means of applying hydraulically transmitted forces to pivot edges.

And still another object is to provide means for transmitting hydraulically applied forces from bellows to pivot edges in which all tendency of such bellows to buckle is obviated.

Other objects and advantages will be apparent from the following description, in which reference is had to the accompanying drawings illustrating preferred embodiments of my invention and wherein similar reference numerals designate similar parts throughout the several views.

In the drawings:

Fig. I is a front elevational view of the head mechanism of a beam scale embodying my invention, parts being broken out and parts being broken away.

Fig. II is a side elevational view, partly in section, of a weighing scale embodying my invention, part of the foundation for such scale being broken away.

Fig. III is an enlarged fragmentary front elevational view, with parts broken out and parts in section, showing one form of bellows and force transmitting linkage and leverage employed in my invention.

Fig. IV is a similarly enlarged fragmentary plan view, with parts in section, showing some of the force transmitting linkage and leverage illustrated in Fig. III.

Fig. V is a fragmentary side elevational view with parts in section substantially as indicated by the line V—V of Fig. IV.

Fig. VI is a fragmentary side elevational view with parts in section substantially as indicated by the line VI—VI of Fig. III.

Fig. VII is a fragmentary plan view, with parts in section, showing a portion of a load counterbalancing beam employed in my invention.

Fig. VIII is a fragmentary front elevational view, with parts in section, showing a modification of bellows and linkage; and Fig. IX is a fragmentary front elevational view showing another modification of such bellows and linkage.

The scale illustrated in the drawings is of the auto truck type supported on a concrete foundation 1 having a pit 2 which contains a weighbridge 3. The weighbridge is supported, through suitable yieldable supporting mechanism 4, upon liquid containing capsules 5.

Connected to each of the capsules 5 is one end of a tube 6, the other end of such tube being connected through a suitable fitting 7 to a nipple 8 that is formed upon the upper end of a cylindrical chamber 9. The nipples 8 extend upwardly through holes in a bracket 11, and nuts 12 are threaded upon the nipples and serve to clamp the cylindrical chambers 9 to the bracket 11, which in turn is supported by the framework of the scale head.

The framework of the scale head comprises two columns 13 and 14, the column 14 being surmounted by a cabinet 15, and the cabinet 15 and the column 13 being connected by a shelf 16 that extends over their tops. The bracket 11 is supported beneath the shelf 16 and is located within the cabinet 15.

Secured within the lower end of each chamber 9 by means of a threaded and liquid-tight joint is an annulus 17, to the upper face of which is brazed or otherwise non-leakably connected the lower edge of a metallic bellows 18, the open end of the bellows being thus sealed within the lower open end of the chamber. Brazed or otherwise non-leakably secured to the upper end of the metallic bellows 18 is a disk 19, within a socket in which is fixed a hard bearing 21 preferably having a conical seat in its lower side. Seated in the conical seat of the bearing 21 is the pointed upper end of a push rod 22 having a bearing 23 at its lower end which is seated upon a knife edge pivot 24. The knife edge pivot 24 is mounted upon a shelf lever 25, the pivot 24 being fixed in a retainer 26. A fulcrum pivot 27 is adjustably secured to the shelf lever 25 by means of a fulcrum pivot retainer 28 which is fixed in adjusted position on the lever 25 by means of a pair of clamping screws 29. The fulcrum pivots rest upon V-groove bearings 30 which are supported, by an adjustably mounted bearing retainer 31, within the cabinet 15 and held in adjusted position by means of another pair of clamping screws 29.

The leverage and linkage of the device described in this application is distinguished by the fact that a separate shelf lever 25 is provided for each of the bellows 18. Thus each of the capsules 5 with the tube 6 connected thereto, and the chamber 9 and bellows 18 to which the tube 6 is a conduit, constitute a separate hydraulic system which transmits forces from one corner of the weighbridge 3 to one of the shelf levers 25, and the four small shelf levers 25 may be regarded as performing the functions ordinarily performed by huge levers which in prior art devices are located beneath weighbridges.

Each shelf lever 25 is provided with a nose pivot 32 fixed in a pivot retainer 33 which is slidably mounted on a bar 34 that is secured to and extends longitudinally of the shelf lever 25. The pivot retainer 33 may be adjusted along the bar 34 by means of an adjusting screw 35, and may be clamped in adjusted position by means of a setscrew 36. The length of the lever arm upon which the nose pivot 32 of each of the levers 25 acts thus may be independently adjusted.

Engaging each of the nose pivots 32 is a bearing 37 mounted in a stirrup 38 which is connected to the lower end of a tension rod 39, the upper end of each of the tension rods 39 being connected to a stirrup 40 in which is mounted a bearing 41 that engages a load pivot 42. Each of the load pivots 42 is fixed in a retainer 43 which is slidably mounted on a bar 44 that forms a part of a beam structure 45, the beam structure 45 being fulcrumed upon fulcrum pivots 46 that rest in V-groove bearings 47 mounted upon a fulcrum stand 48 that is erected upon the shelf 16.

The lever arms upon which the load pivots 42 act are individually adjustable by means of adjusting screws 49. The beam structure 45 thus acts as a gathering lever to co-ordinate forces acting through the separate hydraulic and linkage systems constituted by each of the capsules 5 with the tube 6, chamber 9 and bellows 18 connected thereto, and the push rod 22, shelf lever 25 and tension rod 39 acted upon thereby.

Adjustment of a nose pivot 32 on one of the shelf levers 25 and corresponding adjustment of the load pivot 42 that is connected to that nose pivot will compensate for any departure from predetermined area of the disk 19 or the diaphragm 50 of the capsule 5 in the hydraulic system acting upon that particular shelf lever.

A load counterbalancing beam 51 is incorporated in the beam structure 45, and the free end of the beam 51 swings within a trig loop 52 which is provided with a lock 53. The beam 51 is provided with a poise 54 which may be moved to various positions to counterbalance the weight of loads, and is also provided with small balancing weights 55 and 56 of well known form.

When a load is moved onto the weighbridge 3, the weight of the load is transmitted through the weighbridge supporting mechanism 4 to the diaphragms 50. Pressure is thus applied to the liquids contained in the capsules 5, the tubes 6 and the chambers 9. Pressure in the chambers 9 presses the disks 19 downwardly upon the push rods 22 to swing the shelf levers 25 and to pull downwardly on the tension rods 39. The downward pull is transmitted to the beam structure 45 and is resisted by the counterbalancing effect of the poise 54 which is mounted on the beam 51.

Since the pressure of the liquid is exerted upon the exterior of the bellows 18, the bellows are capable of withstanding much greater pressure than they would be capable of withstanding if the pressure were exerted upon the interior of the bellows as is the case in the device illustrated and described in my copending application Ser. No. 222,831.

Where fluid pressure is exerted upon the interior of a bellows the bellows tends to elongate, and where such elongation is resisted by abutments against the ends the bellows is liable to buckle under extreme internal fluid pressure, since the volumetric content of the bellows is permitted to increase by buckling. In the arrangement illustrated and described in this application, any buckling of one of the metallic bellows 18 decreases the volumetric content of the chamber 9 within which the bellows is sealed, i. e., buckling of the bellows tends to force liquid out of the chamber. Hence, forcing liquid into the chamber cannot cause the bellows to buckle.

Since each capsule 5 with its connected tubing 6 and chamber 9 is a separate hydraulic system which is connected to a separate shelf lever 25, the effect of a load on any corner of the weighbridge 3 can be varied by varying the adjustment of the nose pivot of the shelf lever connected to that corner of the weighbridge and correspondingly varying the adjustment of the load pivot on the beam structure 45. If the diaphragms 50 were all of exactly the same area and if the effective areas of the disks 19 were exactly alike, the fulcrum pivots 27 and the nose pivots 32 of the shelf levers 25 would all be adjusted to cause the multiplication of the shelf levers 25 to be the same, and the knife edges of the load pivots 42 on the beam structure 45 would be aligned. If, however, one of the diaphragms 50 were slightly oversize so that the hydraulic pressure per unit of area in the system of which that diaphragm formed a part were slightly less for a given load, a slight adjustment of the nose pivot 32 on the shelf lever 25 connected to that hydraulic system and a corresponding adjustment of the load pivot 42 to which that nose pivot is connected would compensate for the excess area of the diaphragm.

Oversize of a diaphragm in a capsule 5 is compensated for by moving the nose pivot acted upon through that diaphragm toward the shelf lever fulcrum and by moving the load pivot on the beam structure 45 that is acted upon through that diaphragm away from the beam structure fulcrum.

The load counterbalancing capacity of the beam 51 and poise 54 may be adjusted or changed by moving all the nose pivots 32 and load pivots 42 in the same direction and to the same extent. In making any such adjustment, whether for the purpose of compensating for variations in effective areas of diaphragms or disks in the hydraulic system, or for adjusting or changing the load counterbalancing capacity of the beam 51 and poise 54, each of the load pivots 42 should be kept above the nose pivot 32 to which it is connected, so that the tension rod 39 will be approximately vertical.

In the form of device illustrated in Figs. I to VII inclusive, the push rod 22 has a pivotal connection at one end to the disk 19 and a pivotal connection at its other end to the shelf lever 25. The point of engagement of the push rod 22 with the bearing 21 in the disk 19 is above the major portion of the upper disk surface and, since the push rod tends to hold the bellows 18 extended and the pressure of the liquid within the chamber 9 tends to prevent the bellows from swaying out of its central position, it is unnecessary to check the push rod 22.

In the modification illustrated in Fig. VIII, the chamber 9a and its mounting, as well as the annulus 17a and bellows 18a, may be identical with the corresponding parts of the form illustrated in Figs. I to VII inclusive. The disk 19a, however, is rigidly connected to the upper end of the push rod 22a. Hence, the slight rocking action of the push rod resulting from arcuate movement of the pivot 24a will result in a slight flexing of the bellows 18a.

In the modification illustrated in Fig. IX, the push rod is in the form of a strut 22b rigidly secured to the lever 25b. The upper end of the strut 22b is chisel-shaped to form a knife edge pivot, the knife edge of which lies nearly in the horizontal plane passing through the knife edge of the fulcrum pivots 27b. Hence, the horizontal component of movement of the knife edge at the upper end of the strut 22b is reduced to a minimum. Such horizontal movement as occurs is permitted by slight flexing of the bellows 18b.

It will be observed that in all the modifications illustrated, the hydraulic force is so applied to the bellows and so resisted that there is no tendency of the bellows to buckle. It will be observed further that the bellows and push rod assemblies in all the modifications are stable under pressure and resistance, that is, that neither the bellows nor the thrust members tend to tip out of place when the hydraulic pressures applied to the bellows are resisted by the thrust members. These are very important advantages of the invention. In prior constructions, the bellows had to be stiff enough and the abutments against which the bellows expanded had to be broad enough to prevent buckling and tipping out of position, but in all the forms of this invention the forces are so applied and resisted as to hold the axes of the bellows straight and in proper position.

The embodiments of my invention herein shown and described are to be regarded as illustrative only, and it is to be understood that the invention is susceptible to variation, modification and change within the spirit and scope of the subjoined claims.

Having described my invention, I claim:

1. In a weighing scale, in combination, a commodity receiver, a plurality of capsules supporting said commodity receiver, a chamber corresponding to each of said capsules, a conduit connecting each of said capsules to its corresponding chamber, said capsules, conduits and chambers containing liquid to which pressure is applied by loads on said commodity receiver, a metallic bellows contained in each of said chambers and surrounded by such liquid, whereby each capsule with the conduit, chamber and bellows connected thereto constitutes a separate hydraulic system, a separate lever corresponding to each of such hydraulic systems, each of said levers having a load pivot, means for transmitting force from the bellows of each of such hydraulic systems to the load pivot of its corresponding lever, load counterbalancing mechanism, means connecting each of said levers to said load counterbalancing mechanism, and means for independently adjusting the leverage of each of said levers.

2. In a weighing scale, in combination, a commodity receiver, a plurality of capsules supporting said commodity receiver, a chamber corresponding to each of said capsules, a conduit connecting each of said capsules to its corresponding chamber, said capsules, conduits and chambers containing liquid to which pressure is applied by loads on said commodity receiver, a metallic bellows contained in each of said chambers and surrounded by such liquid, whereby each capsule with the conduit, chamber and bellows connected thereto constitutes a separate hydraulic system, a separate lever corresponding to each of such hydraulic systems, each of said levers having a load pivot, means for transmitting force from the bellows of each of such hydraulic systems to the load pivot of its corresponding lever, each of said levers having an adjustable nose pivot, load counterbalancing mechanism, and means for connecting said adjustable nose pivot to said load counterbalancing mechanism.

3. In a weighing scale, in combination, a commodity receiver, a plurality of capsules supporting said commodity receiver, a chamber corresponding to each of said capsules, a conduit connecting each of said capsules to its corresponding chamber, said capsules, conduits and chambers containing liquid to which pressure is applied by loads on said commodity receiver, a metallic bellows contained in each of said chambers and surrounded by such liquid, there being an opening from the exterior of each of said chambers to the interior of the bellows contained therein, a plurality of separate levers, each of said levers having a load pivot, means acting through each of said openings to transmit forces from each of said bellows to one of said load pivots, load counterbalancing mechanism and means for transmitting force from each of said separate levers to said load counterbalancing mechanism including means for varying the force so transmitted from each of said separate levers to said load counterbalancing mechanism.

4. In a weighing scale, in combination, a commodity receiver, a plurality of capsules supporting said commodity receiver, a chamber corresponding to each of said capsules, a conduit connecting each of said capsules to its corresponding chamber, said capsules, conduits and chambers containing liquid to which pressure is applied by loads on said commodity receiver, a metallic bellows contained in each of said chambers and surrounded by such liquid, there being an opening from the exterior of each of said chambers to the interior of the bellows contained therein, a plurality of separate levers, each of said levers having a load pivot, means acting through each of said openings to transmit forces from each of said bellows to one of said load pivots, each of said levers having an adjustable nose pivot, load counterbalancing mechanism, and means connecting each of said adjustable nose pivots to said load counterbalancing mechanism.

5. In a weighing scale, in combination, a commodity receiver, a plurality of capsules supporting said commodity receiver, a chamber corresponding to each of said capsules, a conduit connecting each of said capsules to its corresponding chamber, said capsules, conduits and chambers containing liquid to which pressure is applied by loads on said commodity receiver, a metallic bellows contained in each of said chambers, there being an opening from the exterior of each of said chambers to the interior of the bellows contained therein, a plurality of separate levers each having a load pivot, a thrust member acted upon by each of said bellows and extending through the opening from the interior of said bellows to the exterior of the chamber containing said bellows, each of said thrust members acting upon the load pivot of one of said levers, each of said levers having an adjustable nose pivot, load counterbalancing means, and means connecting each of said adjustable nose pivots to said load counterbalancing means.

6. In a weighing scale, in combination, a commodity receiver, a plurality of capsules supporting said commodity receiver, a chamber corresponding to each of said capsules, a conduit connecting each of said capsules to its corresponding chamber, said capsules, conduits and chambers containing liquid to which pressure is applied by loads on said commodity receiver, a metallic bellows contained in each of said chambers and surrounded by such liquid, there being an opening from the exterior of each of said chambers to the interior of the bellows contained therein, a plurality of separate levers, a thrust member extending from each of said bellows to one of said levers, one end of each of said thrust members being pivotally connected to one of said bellows, its other end being pivotally connected to one of said levers, load counterbalancing mechanism, and adjustable means connecting each of said levers to said load counterbalancing mechanism whereby the leverage of each of said levers may be adjusted.

7. In a device of the class described, in combination, a frame, a plurality of chambers mounted upon said frame, each of said chambers containing a bellows, there being an opening from the exterior of each of said chambers to the interior of the bellows contained therein, said chambers containing liquid surrounding said bellows and adapted to be subjected to pressure, a thrust member connected to each of said bellows to receive forces resulting from pressure of such liquid, said thrust members extending through said openings, a separate lever acted upon by each of said thrust members, each of said levers having an adjustable nose pivot, load counterbalancing mechanism, and means connecting each of said adjustable load pivots to said load counterbalancing mechanism.

8. In a weighing scale, in combination, a load receiver, a plurality of bellows, means acted upon by said load receiver to transmit hydraulic pressures to the exterior of each of said bellows, a lever corresponding to each of said bellows, a push member extending from the interior of each of said bellows to the lever corresponding thereto, each of said levers having an adjustable nose pivot, a gathering lever, and means connecting said adjustable nose pivots to said gathering lever.

ROBERT S. BOHANNAN.